US010184573B2

(12) United States Patent
Snowdon

(10) Patent No.: US 10,184,573 B2
(45) Date of Patent: Jan. 22, 2019

(54) POWDER ISOLATING VALVE

(71) Applicant: Clyde Process Limited, Aberdeen (GB)

(72) Inventor: Brian Snowdon, Doncaster (GB)

(73) Assignee: Clyde Process Limited, Aberdeen (GB)

( * ) Notice: Subject to any disclaimer, the term of this patent is extended or adjusted under 35 U.S.C. 154(b) by 0 days.

(21) Appl. No.: 15/031,332

(22) PCT Filed: Oct. 29, 2014

(86) PCT No.: PCT/GB2014/053208
§ 371 (c)(1),
(2) Date: Apr. 22, 2016

(87) PCT Pub. No.: WO2015/063473
PCT Pub. Date: May 7, 2015

(65) Prior Publication Data
US 2016/0258541 A1 Sep. 8, 2016

(30) Foreign Application Priority Data

Oct. 31, 2013 (GB) .................................. 1319224.0

(51) Int. Cl.
*F16K 5/20* (2006.01)
*B65D 88/26* (2006.01)
(Continued)

(52) U.S. Cl.
CPC .............. *F16K 5/201* (2013.01); *B65D 88/26* (2013.01); *F16K 5/06* (2013.01); *F16K 5/0621* (2013.01);
(Continued)

(58) Field of Classification Search
CPC ... F16K 5/201; F16K 5/20; F16K 5/06; F16K 5/0621; F16K 5/205; F16K 31/041; B65D 88/26; B65D 2590/542
(Continued)

(56) References Cited

U.S. PATENT DOCUMENTS 2,654,924 A    10/1953  David et al.
2,705,016 A *   3/1955  Saar ........................ F16K 1/228
                                                                        137/1
(Continued)

FOREIGN PATENT DOCUMENTS

DE        30 15 365 A1    10/1981
DE        3544609 A1       6/1987
(Continued)

OTHER PUBLICATIONS

International Search Report for PCT/GB2014/053208, dated Jan. 28, 2015.
(Continued)

*Primary Examiner* — Reinaldo Sanchez-Medina
*Assistant Examiner* — David Colon Morales
(74) *Attorney, Agent, or Firm* — Brinks Gilson & Lione

(57) ABSTRACT

There is described a powder isolating valve which is capable of sealing valves from powder leakage during transport of powder and/or granular material. The valve comprises a rotatable valve closure member (14) and a pneumatically activated sealing mechanism containing a pair of resiliently deformable structures (18,20) extending around a surface of the rotatable valve closure member when the latter is in its closed position, the pair of resiliently deformable structures being held in a pair of annular recesses (32,34) which also extend around an surface of the rotatable valve closure member in its closed position, wherein the pair of resiliently deformable structures are capable of being pneumatically activated to force a sealing ring (26) against the rotatable valve closure member.

17 Claims, 2 Drawing Sheets

(51) Int. Cl.
*F16K 5/06* (2006.01)
*F16K 31/04* (2006.01)

(52) U.S. Cl.
CPC ............ *F16K 5/205* (2013.01); *F16K 31/041* (2013.01); *B65D 2590/542* (2013.01)

(58) Field of Classification Search
USPC .................................................. 251/173, 172
See application file for complete search history.

(56) References Cited

U.S. PATENT DOCUMENTS

| | | | | |
|---|---|---|---|---|
| 3,051,189 A * | 8/1962 | Pro | ...................... | B65D 90/626 |
| | | | | 137/242 |
| 3,062,238 A * | 11/1962 | Winnett | ................... | F16J 3/047 |
| | | | | 251/172 |
| 3,266,769 A * | 8/1966 | Shand | ................. | F16K 5/0673 |
| | | | | 251/172 |
| 3,272,474 A * | 9/1966 | Pro | ...................... | B65D 90/582 |
| | | | | 251/144 |
| 3,497,177 A * | 2/1970 | Hulsey | ................. | F16K 3/0227 |
| | | | | 251/172 |
| 3,610,569 A * | 10/1971 | Reaves | ................. | F16K 3/0254 |
| | | | | 251/159 |
| 3,617,025 A * | 11/1971 | Gerbic | .................... | F16K 5/205 |
| | | | | 251/172 |
| 3,642,248 A * | 2/1972 | Benware | ............... | F16K 1/2266 |
| | | | | 251/172 |
| 3,961,746 A * | 6/1976 | Werner | .................. | B04B 11/05 |
| | | | | 210/359 |
| 4,020,864 A * | 5/1977 | Church, Jr. | ............ | F16K 5/201 |
| | | | | 137/242 |
| 4,073,244 A * | 2/1978 | Snowdon | ............... | B65G 53/12 |
| | | | | 110/165 R |
| 4,085,770 A * | 4/1978 | Woronowicz | ......... | F16K 5/0647 |
| | | | | 137/238 |
| 4,137,935 A * | 2/1979 | Snowdon | ........... | B65G 53/4658 |
| | | | | 137/242 |
| 4,137,936 A * | 2/1979 | Sekimoto | .............. | F16K 5/0673 |
| | | | | 137/246.22 |
| 4,215,722 A * | 8/1980 | Sigmon | .................. | F16K 5/207 |
| | | | | 137/625.3 |
| 4,217,923 A * | 8/1980 | Kindersley | ........... | F16K 5/0636 |
| | | | | 137/315.21 |
| 4,254,793 A * | 3/1981 | Scaramucci | .......... | F16K 5/0673 |
| | | | | 137/246.22 |
| 4,511,150 A * | 4/1985 | Seguenot | .............. | F16K 5/0673 |
| | | | | 251/171 |
| 4,747,578 A * | 5/1988 | Kivipelto | ................ | F16K 5/207 |
| | | | | 251/159 |
| 4,795,132 A * | 1/1989 | Ells | ......................... | F16K 5/205 |
| | | | | 251/159 |
| 4,979,756 A * | 12/1990 | Krambrock | ............ | B65G 53/56 |
| | | | | 137/375 |
| 5,101,853 A * | 4/1992 | Mailliet | .................. | B65G 53/46 |
| | | | | 137/242 |
| 5,253,843 A * | 10/1993 | Garceau | .................. | F16K 5/201 |
| | | | | 251/159 |
| 5,642,751 A * | 7/1997 | Crawley | ............. | B65D 90/582 |
| | | | | 137/340 |
| 6,050,289 A * | 4/2000 | Flores-Verdugo | ........ | F16K 5/20 |
| | | | | 137/340 |
| 6,152,162 A * | 11/2000 | Balazy | ................. | G05D 7/0635 |
| | | | | 137/110 |
| 6,206,024 B1 * | 3/2001 | Naberhaus | ............ | F16K 5/0642 |
| | | | | 137/15.24 |
| 6,213,450 B1 * | 4/2001 | Palmer | .................... | F16K 5/205 |
| | | | | 137/15.06 |
| 6,805,332 B2 * | 10/2004 | Crawley | ................. | F16K 5/205 |
| | | | | 251/172 |
| 7,275,564 B2 * | 10/2007 | Bazin | ...................... | F16K 5/201 |
| | | | | 137/625.47 |
| 7,484,710 B2 * | 2/2009 | Koester | ................. | F16K 5/0678 |
| | | | | 251/160 |

FOREIGN PATENT DOCUMENTS

| | | | | |
|---|---|---|---|---|
| EP | 0223589 A2 * | 5/1987 | ............. | B65G 53/06 |
| EP | 0 985 863 A2 | 3/2000 | | |
| GB | 1245109 A * | 9/1971 | ............... | F16K 5/06 |
| GB | 1460778 A | 1/1977 | | |
| GB | 2 144 522 A | 3/1985 | | |
| GB | 2 230 841 A | 10/1990 | | |
| GB | 2279429 A * | 1/1995 | ........... | B65D 90/582 |
| JP | S60 14663 A1 | 1/1985 | | |

OTHER PUBLICATIONS

Chinese Office Action and Search Report for Application No. 201480059371.5, dated Mar. 29, 2018.

* cited by examiner

POWDER ISOLATING VALVE

CROSS-REFERENCE TO RELATED APPLICATIONS

This application is a National Stage application of International Application No. PCT/GB2014/053208 filed Oct. 29, 2014, which claims the benefit GB Application No. 1319224.0 filed Oct. 31, 2013, the entire contents of which are each hereby incorporated herein by reference.

FIELD OF THE INVENTION

The present invention relates to a powder isolating valve. More particularly, the present invention relates to a large low pressure isolating valve which is capable of sealing valves from powder leakage during transport of powder and/or granular material.

BACKGROUND OF THE INVENTION

There is a need in the technical field of transporting powder and/or granular material to provide a powder isolating valve to cut off and seal powder and/or granular material flow from storage hoppers and bins.

This is traditionally done with commonly known slide valves. There are various styles and configurations of slide valves but they all suffer from either leakage, jamming or a combination of both of these problems. This is a well know problem for the powder handling industry and at the present time there is no satisfactory solution. In addition, jamming with powder is a particular problem with larger valves above 300 mm diameter where large actuators are required to overcome the friction in slide valves.

Other types of valve are used such as butterfly valves but they can be difficult to turn in a packed head of material and the blade is an obstruction to flow. Inflatable seal valves with a spherical closure member are an alternative but are expensive, heavy and the valve sealing systems are expensive to produce with larger sizes requiring special moulds for rubber seals. The machined parts surrounding moulded inflatable valve seals are close tolerance intricate shapes and are therefore expensive to produce.

For powder isolation it is not necessary to provide a gas tight seal through the valve but powder should not be able to pass through the valve. It is however necessary to provide a good seal for gas and powder to the outside of the valve. One of the big disadvantages of slide valves is that it is difficult to stop the blade from dragging material out as the valve opens. The blade can also lead to leakage of powder. Another difficulty with large size slide valves with flat blades is making the valves strong enough to resist failure in the event of an internal dust explosion. It is a requirement to have a containment design which is capable of dealing with an internal explosion due to the explosion risk of combustible material being transported such as coal dust. This is relatively easy to achieve with a spherical closure member.

It is an object of at least one aspect of the present invention to obviate or mitigate at least one or more of the aforementioned problems.

It is a further object of at least one aspect of the present invention to provide a powder isolating valve which is capable of sealing valves from powder leakage during the transport of powder and/or granular material.

SUMMARY OF THE INVENTION

According to a first aspect of the present invention there is provided an isolating valve which is capable of sealing valves from powder leakage during transport of powder and/or granular material, the isolating valve comprising:
a rotatable valve closure member;
a pneumatically activated sealing mechanism containing a pair of resiliently deformable structures extending around an upper surface of the rotatable valve closure member,
the pair of resiliently deformable structures being held in a pair of annular recesses which also extend around an upper surface of the rotatable valve closure member;
wherein the pair of resiliently deformable structures are capable of being pneumatically activated to force a sealing ring against the rotatable valve closure member to form a seal to prevent leakage of powder and/or granular material.

The powder and/or granular material may be in any form such as material formed in mining applications including coal dust. The powder and/or granular material may also comprise dust material from which ferrous material may be formed, chemicals, pharmaceuticals, food products and material used to form plastics.

The powder and/or granular material may be fed into an upper part of the isolating valve using any suitable feed system such as a hopper.

The valve closure member may be part spherical in shape and may, for example, be in the form of an arc.

The valve closure member may have a thin profile of about 1-5 cm thickness which helps to reduce weight. The valve closure member may be made from any suitable metal, alloy or plastics material.

The valve closure member may be rotated from a closed position where the valve closure member prevents the flow of the powder and/or granular material to an open position where the powder and/or granular material can freely flow.

The valve closure member may be rotated about a pivot point using a motor.

In particular embodiments the valve closure member can be rotated 90 degrees in an anti-clockwise or clockwise direction from a closed position to an open position and back to a closed position. By rotation of the valve closure member the valve therefore moves from a closed to an open position and back to an open position.

The pneumatically activated sealing mechanism may comprise at least one or more resiliently deformable structures on the rotatable valve closure. The resiliently deformable structures may be on the same side as the incoming flow of the powder and/or granular material.

The resiliently deformable structures may be held in recesses and the resiliently deformable structures themselves therefore do not move but deform under pneumatic force e.g. the force of compressed air.

The resiliently deformable structures may therefore be capable of being pneumatically activated to force the sealing ring against the rotatable valve closure member to form a seal to prevent leakage of powder and/or granular material.

The resiliently deformable structures may be any suitable deformable structure made from a rubber composite. In particular embodiments, the resiliently deformable structures may be rubber 'O' rings.

There may be a pair of resiliently deformable structures in the form of, for example, 'O' rings near to the valve closure member which can be pneumatically activated to form a tight seal with the sealing ring. The sealing ring may be made from metal or plastics. The seal although not necessarily having to be air tight must be able to prevent the leakage of the powder and/or granular material.

The sealing of the sealing rings may therefore be activated by the resiliently deformable structures being placed under pneumatic pressure and deforming. Compressed air may therefore act against the resiliently deformable structures and force the resiliently deformable structures down against the sealing rings which has the effect of forcing the sealing rings against the surface of the valve closure member and forming a tight seal. The distance between the sealing rings and the valve closure member may be small and may be about 0.1-1 mm or typically about 0.5 mm.

When the pneumatic pressure (e.g. compressed air) is released the resiliently deformable structures may return to their original shape and size with the result that the sealing rings return back up to their original position and form the small gap between the sealing rings and the valve closure member.

The resiliently deformable structures may be made from extruded round cord which can be glued to form a ring. Any appropriate size and shape of resiliently deformable structure can therefore be cheaply made.

The pneumatic pressure (e.g. compressed air) may be fed into and along a channel. When the channel is filled with, for example, compressed air this has the effect of pressing the sealing ring against the valve closure member and forming a closed position for the pressure isolating valve. This has the effect of preventing powder leakage by forming a tight seal between the metal sealing ring and the valve closure member.

According to a second aspect of the present invention there is provided a method of preventing powder leakage during transport of powder and/or granular material using an isolating valve, said method comprising:

providing a rotatable valve closure member; and providing a pneumatically activated sealing mechanism containing a resiliently deformable structure, whereupon the resiliently deformable structure is capable of being pneumatically activated to force a sealing ring against the rotatable valve closure member to form a seal to prevent leakage of powder and/or granular material.

The isolating valve may be as defined in the first aspect.

BRIEF DESCRIPTION OF THE DRAWINGS

Embodiments of the present invention will now be described, by way of example only, with reference to the accompanying drawings in which.

BRIEF DESCRIPTION

Generally speaking, the present invention resides in the provision of a low pressure isolating valve which is capable of sealing valves from powder leakage during transport of powder and/or granular material.

Figure 1:
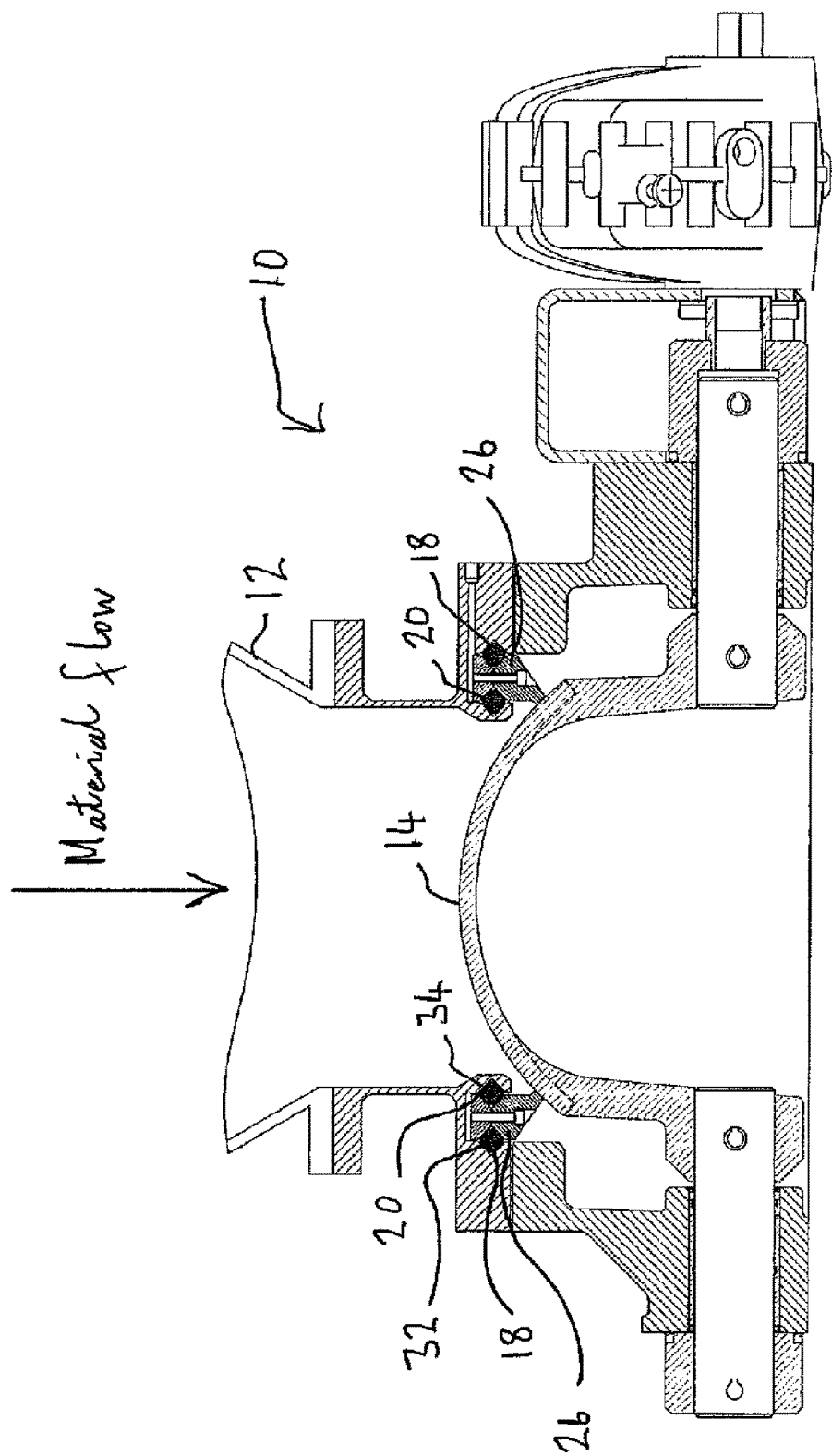
FIG. 1 is a cross-sectional view of an isolating valve according to an embodiment of the present invention.
Figure 2:
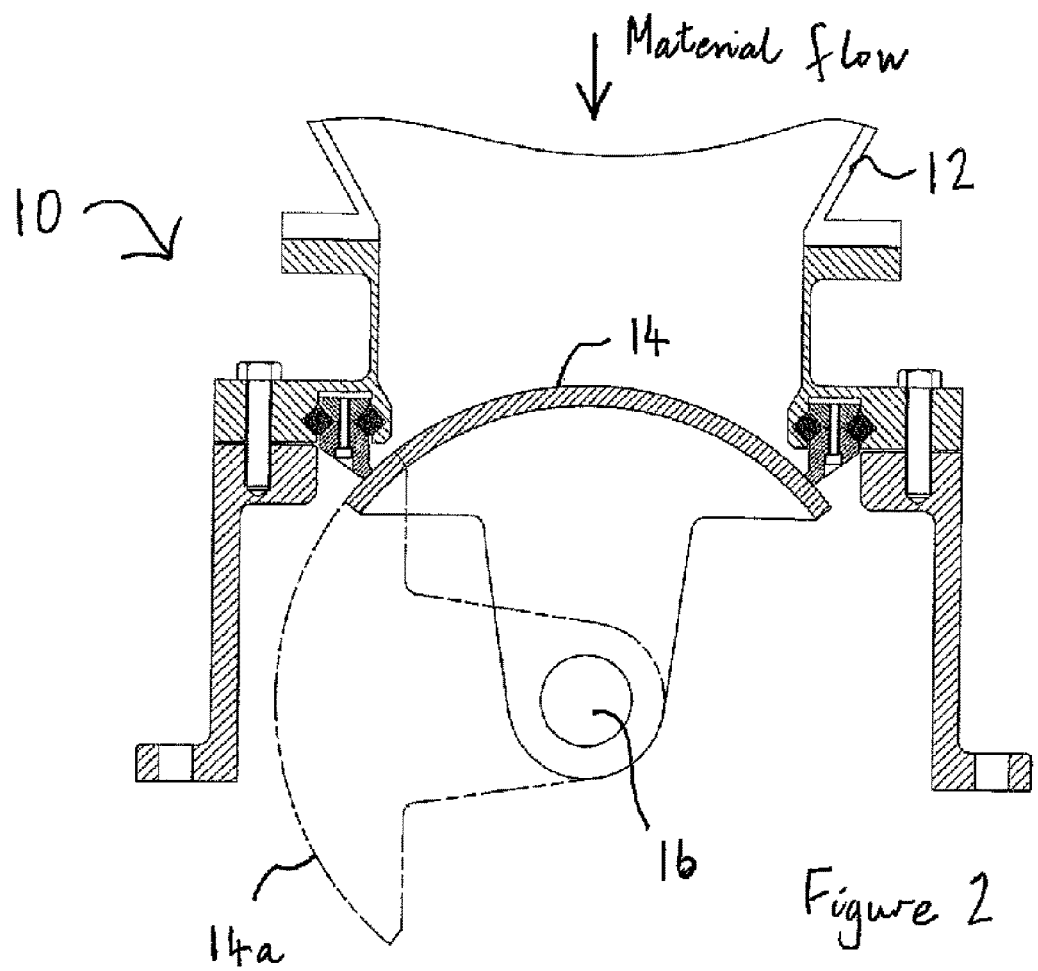
FIG. 2 is a further cross-sectional view of the isolating valve shown in FIG. 1.

FIGS. 1 and 2 are representations of a pressure isolating valve according to the present invention generally designated 10. The pressure isolating valve 10 has a hopper 12 via which powder and/or granular material is fed. The powder and/or granular material includes material formed in mining applications (e.g. coal dust) and dust material from which ferrous material may be formed, chemicals, pharmaceuticals, food products and material used to form plastics.

As shown in FIGS. 1 and 2 the powder and/or granular material flows down the hopper 12 until it resides against a valve closure member 14 in the shape of an arc. The valve closure member 14 is therefore part spherical and can be rotated about a rotation point 16. As shown in FIG. 2 the valve closure member 14 can be rotated 90 degrees in an anti-clockwise direction where the location of the valve closure member is shown by dotted lines and reference numeral 14a. Alternatively, the valve closure member 14 can be rotated 90 degrees in a clockwise direction. By rotation of the valve closure member 14 the valve therefore moves from a closed to an open position. The valve closure member 14 has a thin profile which helps to reduce weight.

Figure 3:
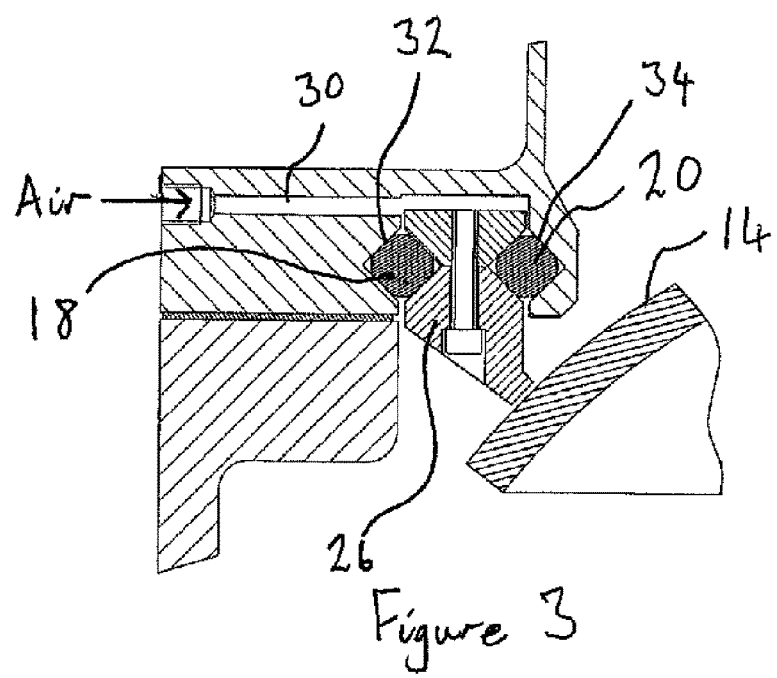
FIG. 3 is a cross-sectional expanded view of part of the isolating valve shown in FIGS. 1 and 2.

FIG. 3 is an expanded view of part of the pressure isolating valve 10. There is shown a pair of soft rubber 'O' rings 18, 20 which extend around the upper surface of the valve closure member. As clearly shown in FIG. 3 the soft rubber 'O' rings 18, 20 can be forced against a metal sealing ring 26. The metal sealing ring 26 can therefore be held in place by the soft rubber 'O' rings 18, 20.

The soft rubber 'O' rings 18, 20 are therefore captive in annular recesses 32, 34 and do not themselves move but deform under the force of compressed air. The compressed air acts above the soft rubber 'O' rings 18, 20 and forces the soft rubber 'O' rings 18, 20 down against the sealing ring 26 which has the effect of forcing the sealing ring 26 against the surface of the valve closure member 14. The distance between the sealing ring 26 and the valve closure member 14 is small and is about 1 mm.

When the compressed air is released the soft rubber 'O' rings 18, 20, return to their original shape and size with the result that the 'O' rings 18, 20 pulls the sealing ring 26 back up to their original position forming about a 1 mm gap between the sealing ring 26 and the valve closure member 14.

A specific advantage of the present invention is that the 'O' rings 18, 20 are cheap to manufacture and can be made into any required shape and size from extruded round cord. The extruded round cord can be glued to form a ring and to allow small batch quantities to be economically made.

A further specific advantage of the present invention is that on the side of the valve closure member 14 facing the powder and/or granular material there are no close fitting sliding parts that could jam due to powder and/or granular material ingress. This is not the case with prior art devices which are well known to stick and jam.

FIG. 3 shows that compressed air can be fed into and along channel 30. When the channel is filled with compressed air this has the effect of pressing the metal sealing ring 26 against the valve closure member 14 and forming a closed position for the pressure isolating valve 10. This has the effect of preventing powder leakage by forming a tight seal between the metal sealing ring 26 and the valve closure member 14. As shown in FIGS. 1 and 2 there is a similar compressed air mechanism on the opposite side of the pressure isolating valve 10.

In FIG. 3 it can be seen that there is a small gap between the metal sealing ring 26 and the valve closure member 14. The metal sealing ring 26 is therefore held a small distance away from the valve closure member 14 to reduce closing load. To form a tight seal when the valve closure member 14 is in the closed configuration compressed air is forced into the channel 30. It should be noted that the metal sealing ring 26 does not rotate.

Whilst specific embodiments of the present invention have been described above, it will be appreciated that departures from the described embodiments may still fall within the scope of the present invention. For example, any suitable type of deformable device may be used instead of 'O' rings that has the ability to deform and return the sealing ring back to its original position.

The invention claimed is:

1. An isolating valve for the prevention of powder leakage during transport of powder and/or granular material, the isolating valve comprising:
   a rotatable valve closure member; and
   a pneumatically activated sealing mechanism consisting essentially of:
      a pair of rubber O-rings extending around an upper surface of the rotatable valve closure member;
      a pair of annular recesses extending around the upper surface of the rotatable valve closure member;
      a sealing ring held in place by the pair of rubber O-rings; and
      a channel for delivering compressed air above the rubber O-rings to force the pair of rubber O-rings down against the sealing ring which
   forces the sealing ring against the rotatable valve closure member to form a seal to prevent leakage of powder and/or granular material,
   wherein the pair of rubber O-rings are captive in the pair of annular recesses and do not move but deform under pneumatic force from the compressed air.

2. The isolating valve according to claim 1, wherein the pair of rubber O-rings are on a same side as incoming flow of the powder and/or granular material.

3. The isolating valve according to claim 1, wherein the rubber O-rings comprise a rubber composite.

4. The isolating valve according to claim 1, wherein the powder and/or granular material is a material formed in mining applications, chemical, pharmaceutical, food product or material used to form plastics.

5. The isolating valve according to claim 4, wherein the material formed in mining applications is coal dust, dust material from which ferrous material is formed, or a combination thereof.

6. The isolating valve according to claim 1, wherein the powder and/or granular material is fed into an upper part of the isolating valve using a hopper.

7. The isolating valve according to claim 1, wherein the valve closure member is part spherical in shape.

8. The isolating valve according to claim 1, wherein the valve closure member is from about 1 cm to about 5 cm thick.

9. The isolating valve according to claim 1, wherein the valve closure member comprises metal, alloy, plastic, or a combination thereof.

10. The isolating valve according to claim 1, wherein the valve closure member is rotated from a closed position where the valve closure member prevents the flow of the powder and/or granular material to an open position where the powder and/or granular material can freely flow.

11. The isolating valve according claim 1, wherein the valve closure member is rotatable about a pivot point using a motor.

12. The isolating valve according to claim 1, wherein the valve closure member is capable of being rotated 90 degrees in a counter clockwise or clockwise direction from a closed position to an open position and back to the closed position.

13. The isolating valve according to claim 1, wherein the sealing ring comprises metal, plastic, or a combination thereof.

14. The isolating valve according to claim 1, wherein the distance between the sealing ring and the valve closure member is about 0.1 mm to about 1 mm.

15. The isolating valve according to claim 1, wherein when the compressed air is released the rubber O-rings return to their original shape and size with the result that the sealing ring returns back up to an original position and forms a small gap of between about 0.1 mm to about 1 mm between the sealing ring and the valve closure member.

16. The isolating valve according to claim 1, wherein when the channel is filled with compressed air, the sealing ring is pressed against the valve closure member forming a closed position for the pressure isolating valve.

17. A method of preventing powder leakage during transport of powder and/or granular material using the isolating valve of claim 1, said method comprising:
   feeding compressed air into and along the channel of the pneumatically activated sealing mechanism to force the sealing ring against the rotatable valve closure member to form a seal to prevent leakage of the powder and/or granular material.

* * * * *